US011848711B2

(12) United States Patent
Vegas Olmos et al.

(10) Patent No.: US 11,848,711 B2
(45) Date of Patent: Dec. 19, 2023

(54) NETWORK INTERFACE CARD FOR QUANTUM COMPUTING OVER CLASSICAL AND QUANTUM COMMUNICATION CHANNELS

(71) Applicant: Mellanox Technologies, Ltd., Yokneam (IL)

(72) Inventors: Juan Jose Vegas Olmos, Solrod Strand (DK); Elad Mentovich, Tel Aviv (IL); Liran Liss, Misgav Am (IL); Yonathan Piasetzky, Yokneam (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/675,669

(22) Filed: Feb. 18, 2022

(65) Prior Publication Data

US 2023/0269003 A1    Aug. 24, 2023

(51) Int. Cl.
*H04B 10/70* (2013.01)
*G06N 10/40* (2022.01)
*H04B 10/60* (2013.01)

(52) U.S. Cl.
CPC ............. *H04B 10/70* (2013.01); *G06N 10/40* (2022.01); *H04B 10/60* (2013.01)

(58) Field of Classification Search
None
See application file for complete search history.

(56) References Cited

U.S. PATENT DOCUMENTS

| | | | | |
|---|---|---|---|---|
| 5,418,905 A | * | 5/1995 | Rarity | H04B 10/70 398/40 |
| 6,741,374 B2 | * | 5/2004 | Pittman | B82Y 10/00 359/107 |
| 8,295,485 B2 | * | 10/2012 | Yuan | H04B 10/70 713/168 |
| 8,433,070 B2 | * | 4/2013 | Habif | H04B 10/70 380/278 |
| 8,620,166 B2 | * | 12/2013 | Guha | H04B 10/70 398/209 |
| 9,077,577 B1 | | 7/2015 | Ashrafi et al. | |
| 9,306,739 B1 | * | 4/2016 | Troupe | H04L 9/0858 |
| 9,356,780 B2 | | 5/2016 | Tanizawa et al. | |
| 9,692,523 B2 | * | 6/2017 | Smith | H04B 10/85 |

(Continued)

OTHER PUBLICATIONS

Navarrete, Glynis, What is a PCIe Switch?, Nov. 2021 (Year: 2021).*

(Continued)

*Primary Examiner* — Jai M Lee
(74) *Attorney, Agent, or Firm* — Moore & Van Allen PLLC; Michael M. McCraw

(57) ABSTRACT

Embodiments are disclosed for facilitating quantum computing over classical and quantum communication channels. An example system includes a network interface card (NIC) apparatus. The NIC apparatus includes an optical receiver, an embedded processor, and a network switch. The optical receiver is configured to receive qubit data via a first communication channel associated with quantum communication. The embedded processor is configured to convert the qubit data into binary bit data. The network switch is configured to output the binary bit data via a second communication channel associated with classical network communication.

20 Claims, 7 Drawing Sheets

(56) References Cited

U.S. PATENT DOCUMENTS

| | | | |
|---|---|---|---|
| 9,794,065 B2* | 10/2017 | Wabnig | H04B 10/70 |
| 9,876,639 B2* | 1/2018 | Choi | H04L 9/0858 |
| 10,594,408 B2* | 3/2020 | Bishop | G06N 10/00 |
| 10,855,453 B1* | 12/2020 | Vakili | H04L 9/0844 |
| 10,855,457 B1* | 12/2020 | Vakili | H04L 9/0869 |
| 10,862,677 B2* | 12/2020 | Bitauld | H04L 9/0852 |
| 10,992,391 B1* | 4/2021 | Meyers | H04B 10/0799 |
| 11,163,535 B1* | 11/2021 | Vakili | H04B 10/0795 |
| 11,212,086 B2* | 12/2021 | Rhee | H04L 9/0858 |
| 11,309,970 B2* | 4/2022 | Woodward | H04B 10/70 |
| 11,329,809 B2* | 5/2022 | Forbes | H04B 10/50 |
| 11,405,115 B2* | 8/2022 | Gimeno-Segovia | H04B 10/70 |
| 11,444,636 B2* | 9/2022 | Lucarelli | H03M 13/2906 |
| 11,451,308 B1 | 9/2022 | Bucklew et al. | |
| 11,483,144 B1* | 10/2022 | Vakili | H04L 9/0852 |
| 2008/0165957 A1 | 7/2008 | Kandasamy et al. | |
| 2010/0166429 A1* | 7/2010 | Odaka | H04Q 11/0067 398/115 |
| 2013/0101119 A1 | 4/2013 | Nordholt et al. | |
| 2017/0214525 A1 | 7/2017 | Zhao et al. | |
| 2017/0344898 A1* | 11/2017 | Karimi | G06N 10/00 |
| 2021/0105135 A1* | 4/2021 | Figueroa | H04L 9/0858 |
| 2021/0152347 A1* | 5/2021 | Cambou | H04B 10/07957 |
| 2021/0174237 A1* | 6/2021 | Mentovich | G06N 10/00 |
| 2021/0342161 A1* | 11/2021 | Lauer | H04B 10/70 |
| 2022/0006627 A1 | 1/2022 | Ko et al. | |
| 2022/0224996 A1* | 7/2022 | Nickerson | H03K 17/92 |
| 2022/0245496 A1* | 8/2022 | Singh | G06V 30/40 |
| 2023/0059433 A1* | 2/2023 | Lecocq | H04B 10/70 |

OTHER PUBLICATIONS

Notice of Allowance dated Mar. 14, 2023, in pending U.S. Appl. No. 17/227,321.

* cited by examiner

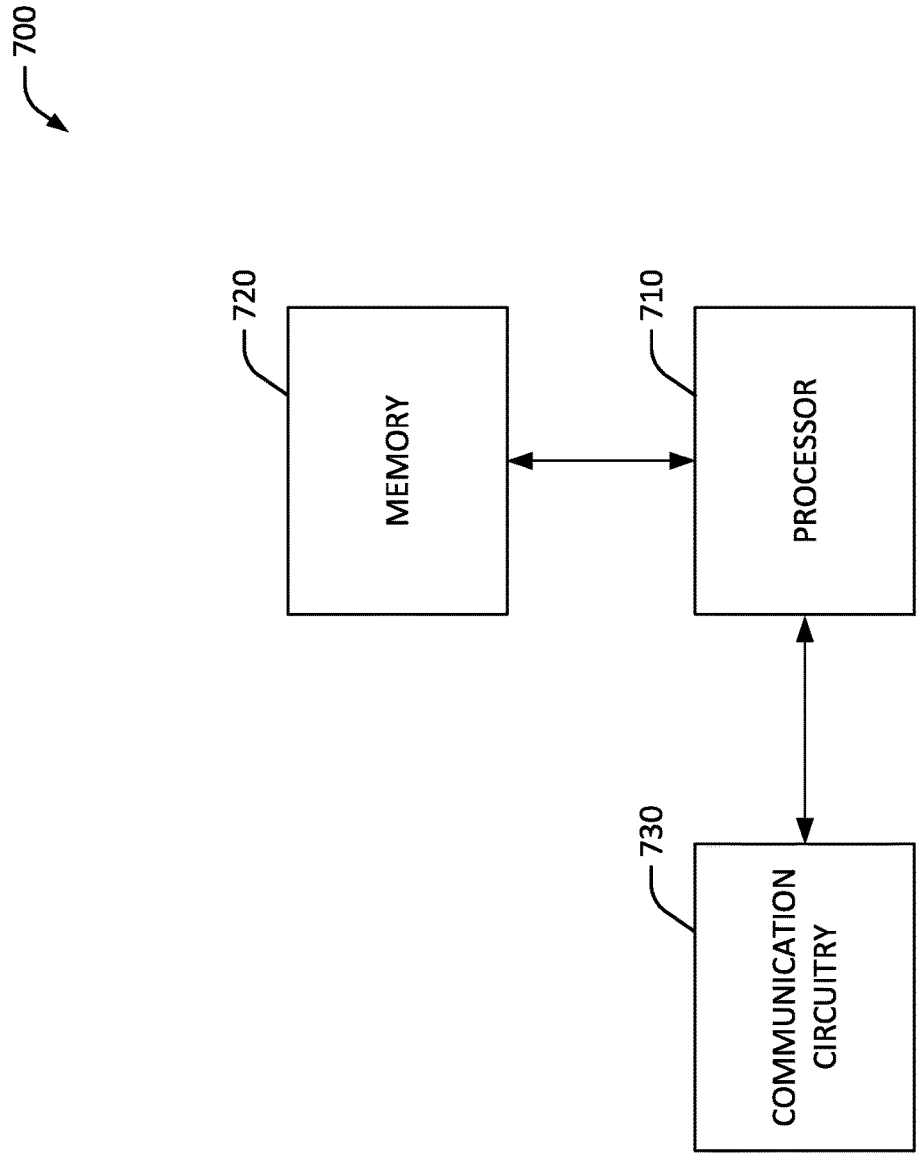

NETWORK INTERFACE CARD FOR QUANTUM COMPUTING OVER CLASSICAL AND QUANTUM COMMUNICATION CHANNELS

TECHNOLOGICAL FIELD

Embodiments of the present invention relate generally to network interface cards and/or network interface card adapters to interconnect different types of processors.

BACKGROUND

Traditionally, datacenters and high-performance computing (HPC) clusters include communication links, adapters, switches and purpose-specific components, and/or other computing components. Switches in datacenters and/or HPC clusters generally distribute data flows through communication links to adapters and/or purpose-specific components. Purpose-specific components include, for example, classical processing components (e.g., a central processing unit (CPU), a graphics processing unit (GPU), etc.), reconfigurable processing components (e.g., field-programmable gate array (FPGA), application-specific integrated circuit (ASIC), etc.), memory components (e.g., dynamic random-access memory (DRAM), persistent memory, etc.), and/or other types of processing components. Furthermore, quantum technologies have also recently been introduced to datacenters and HPC clusters. For example, quantum computing and/or quantum communications is becoming increasingly desirable for datacenters and HPC clusters. However, it is generally difficult and/or inefficient to introduce quantum computing and/or quantum communications within a datacenter and/or a HPC cluster configured for classical computing and/or classical communications.

BRIEF SUMMARY

Example embodiments of the present invention relate generally to a system(s), method and apparatus to facilitate quantum computing over classical and quantum communication channels. The details of some embodiments of the subject matter described in this specification are set forth in the accompanying drawings and the description below. Other features, aspects, and advantages of the subject matter will become apparent from the description, the drawings, and the claims.

In an embodiment, a network interface card (NIC) apparatus comprises an optical receiver, an embedded processor, and a network switch. The optical receiver is configured to receive qubit data via a first communication channel associated with quantum communication. The embedded processor is configured to convert the qubit data into binary bit data. The network switch is configured to output the binary bit data via a second communication channel associated with classical network communication.

In one or more embodiments, the optical receiver is configured to determine amplitude data associated with the qubit data. Additionally, in one or more embodiments, the embedded processor is configured to convert the qubit data into the binary bit data based on the amplitude data.

In one or more embodiments, the optical receiver is configured to determine phase data associated with the qubit data. Additionally, in one or more embodiments, the embedded processor is configured to convert the qubit data into the binary bit data based on the phase data.

In one or more embodiments, the embedded processor is a system on chip (SoC) configured to convert the qubit data into the binary bit data.

In one or more embodiments, the embedded processor is an array of central processing units (CPUs) configured to convert the qubit data into the binary bit data.

In one or more embodiments, the embedded processor is a graphics processing unit (GPU) configured to convert the qubit data into the binary bit data.

In one or more embodiments, the embedded processor is a field-programmable gate array (FPGA) configured to convert the qubit data into the binary bit data.

In one or more embodiments, the embedded processor is configured to convert the qubit data into the binary bit data based on a quantum key distribution (QKD) protocol associated with the qubit data.

In one or more embodiments, the embedded processor is configured to further perform digital signal processing with respect to the binary bit data.

In one or more embodiments, the network switch is a Peripheral Component Interconnect Express (PCIe) switch.

In another embodiment, a system comprises a quantum computer and a NIC. The NIC comprises an optical receiver, an embedded processor, and a network switch. The optical receiver is configured to receive qubit data from the quantum computer. The embedded processor is configured to convert the qubit data into binary bit data. The network switch is configured to output the binary bit data via a communication channel associated with classical network communication.

In one or more embodiments, the optical receiver is configured to determine amplitude data associated with the qubit data. Additionally, in one or more embodiments, the embedded processor is configured to convert the qubit data into the binary bit data based on the amplitude data.

In one or more embodiments, the optical receiver is configured to determine phase data associated with the qubit data. Additionally, in one or more embodiments, the embedded processor is configured to convert the qubit data into the binary bit data based on the phase data.

In one or more embodiments, the embedded processor is a SoC configured to convert the qubit data into the binary bit data.

In one or more embodiments, the embedded processor is an array of CPUs configured to convert the qubit data into the binary bit data.

In one or more embodiments, the embedded processor is a GPU configured to convert the qubit data into the binary bit data.

In one or more embodiments, the embedded processor is an FPGA configured to convert the qubit data into the binary bit data.

In one or more embodiments, the embedded processor is configured to convert the qubit data into the binary bit data based on a QKD protocol associated with the qubit data.

In one or more embodiments, the embedded processor is configured to further perform digital signal processing with respect to the binary bit data.

In yet another embodiment, a method is provided. The method provides for receiving, via a network interface card, qubit data via a first communication channel associated with quantum communication. The method also provides for converting, via an embedded processor of the network interface card, the qubit data into binary bit data. Furthermore, the method provides for outputting, via the network interface card, the binary bit data via a second communication channel associated with classical network communication.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Figure 1:
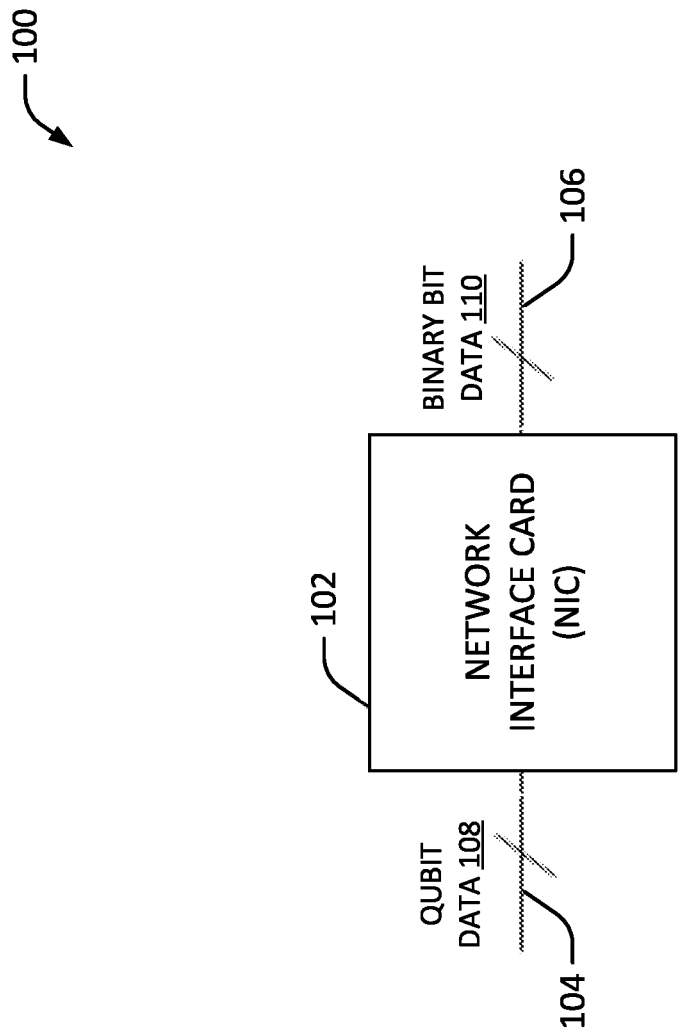
Figure 2:
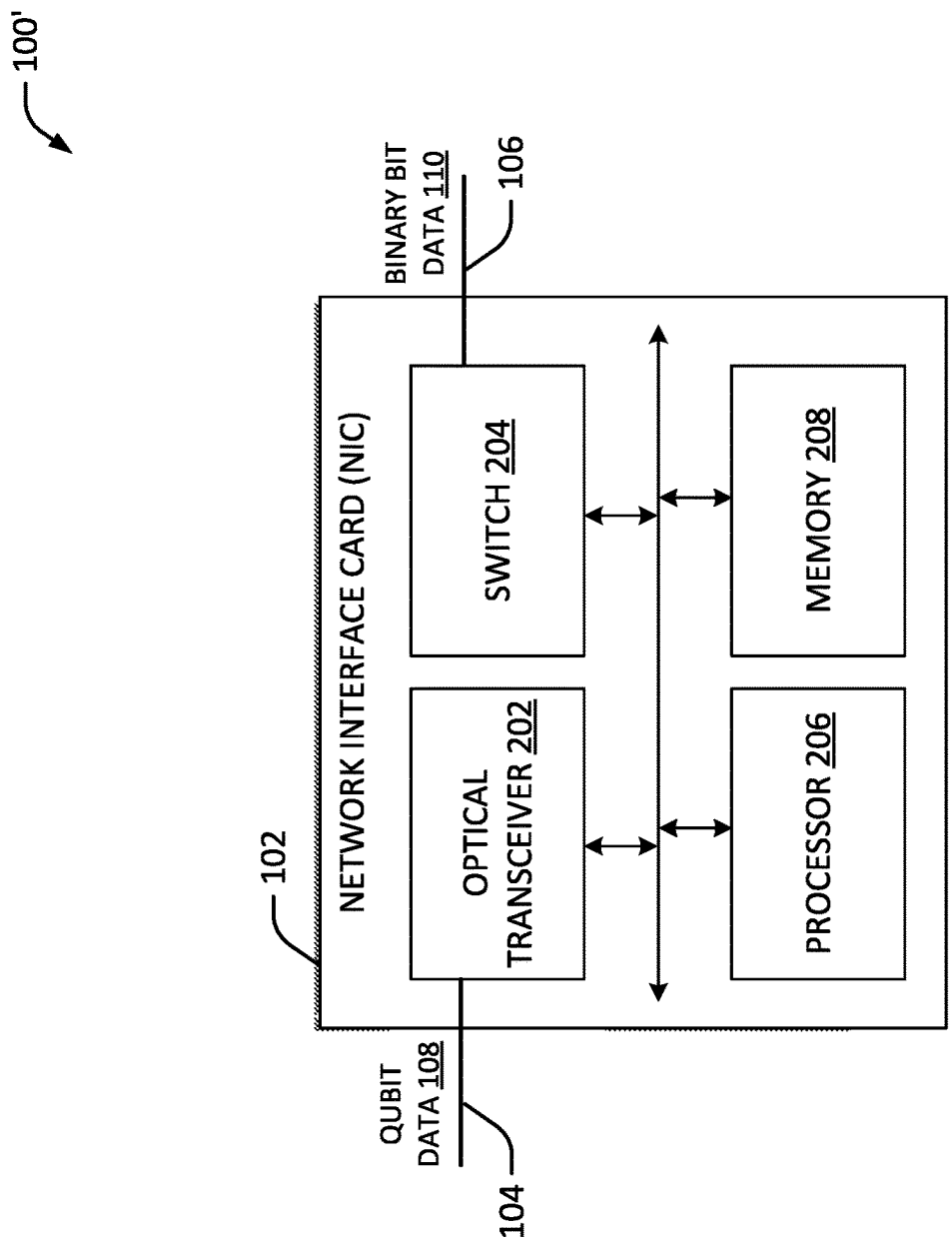
Figure 3:
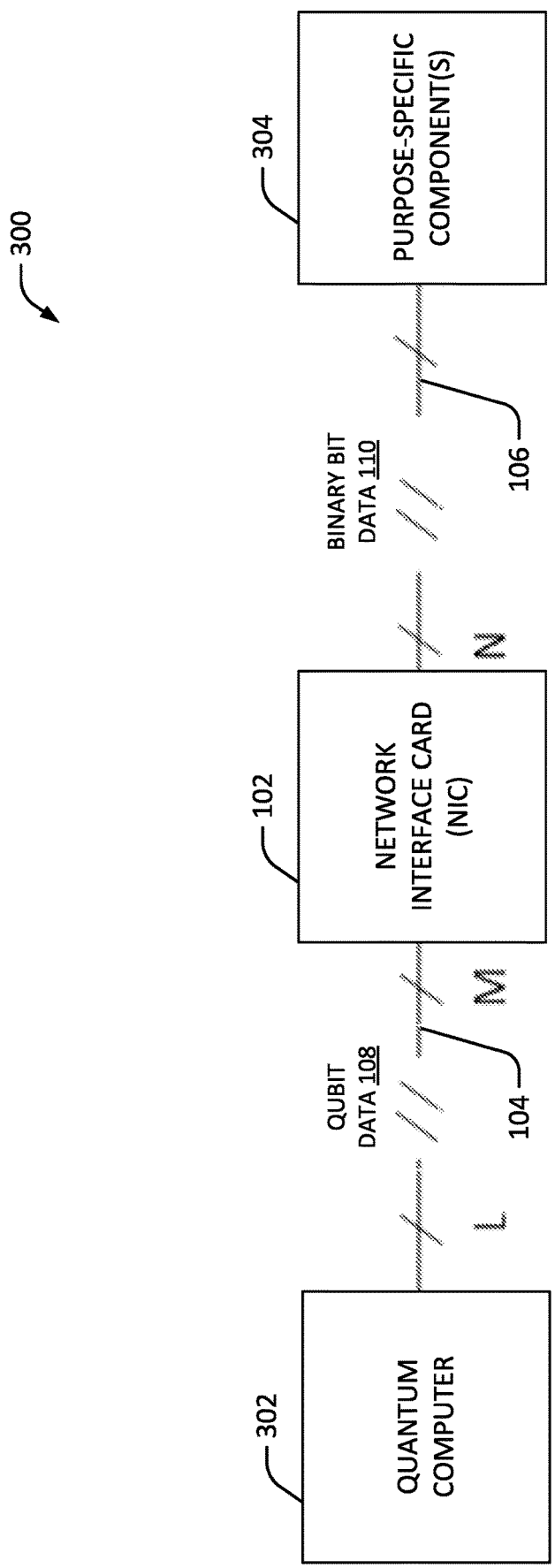
Figure 4:
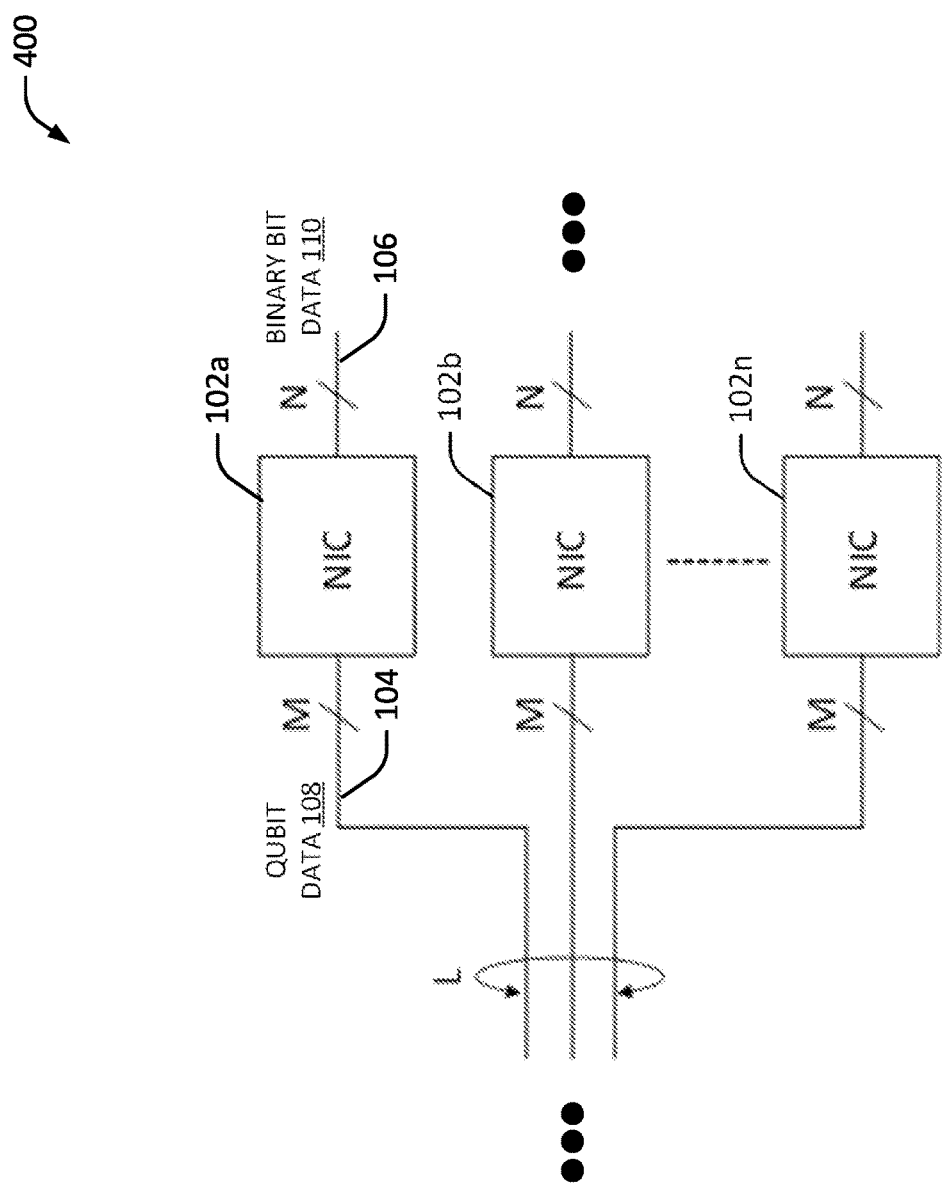
Figure 5:
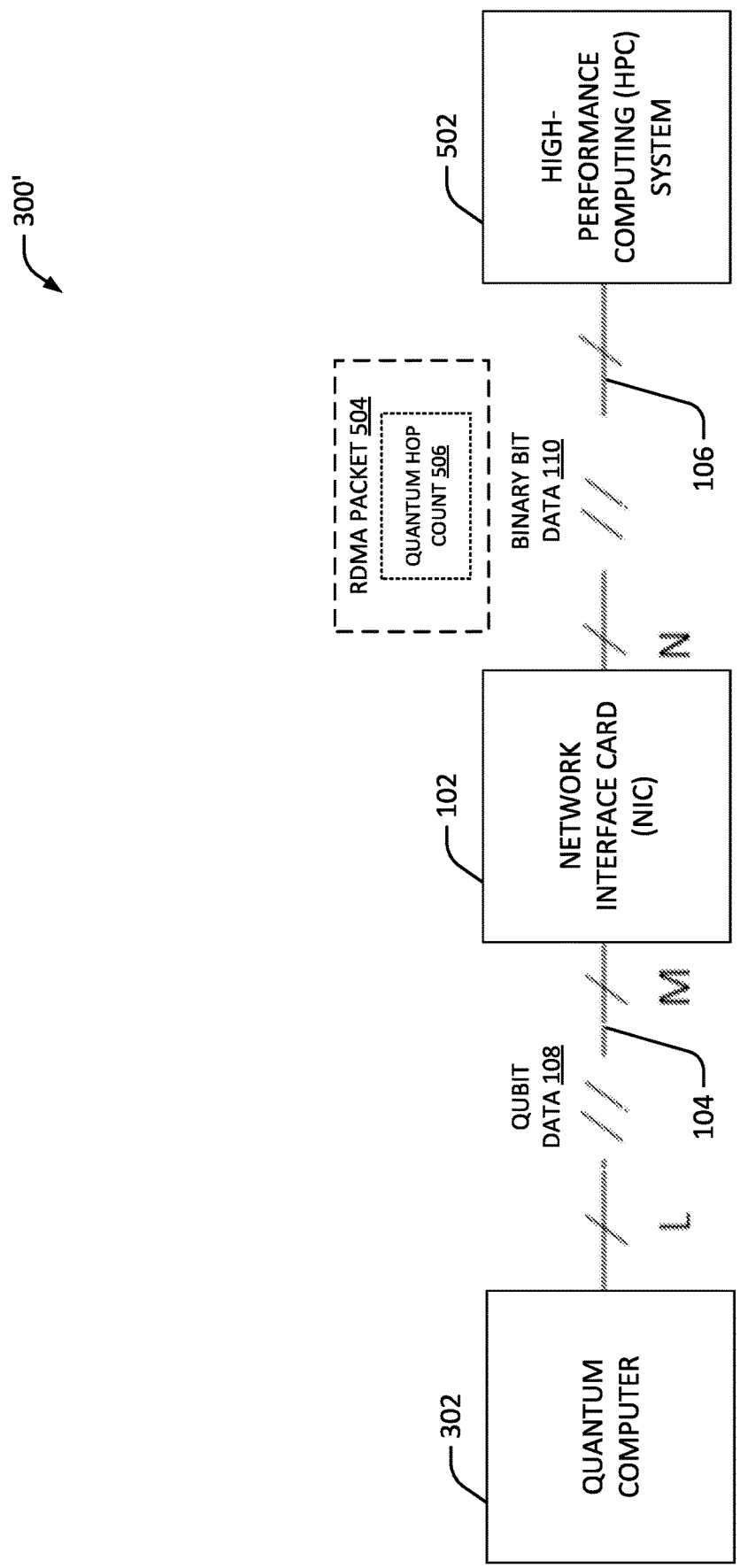
Figure 6:
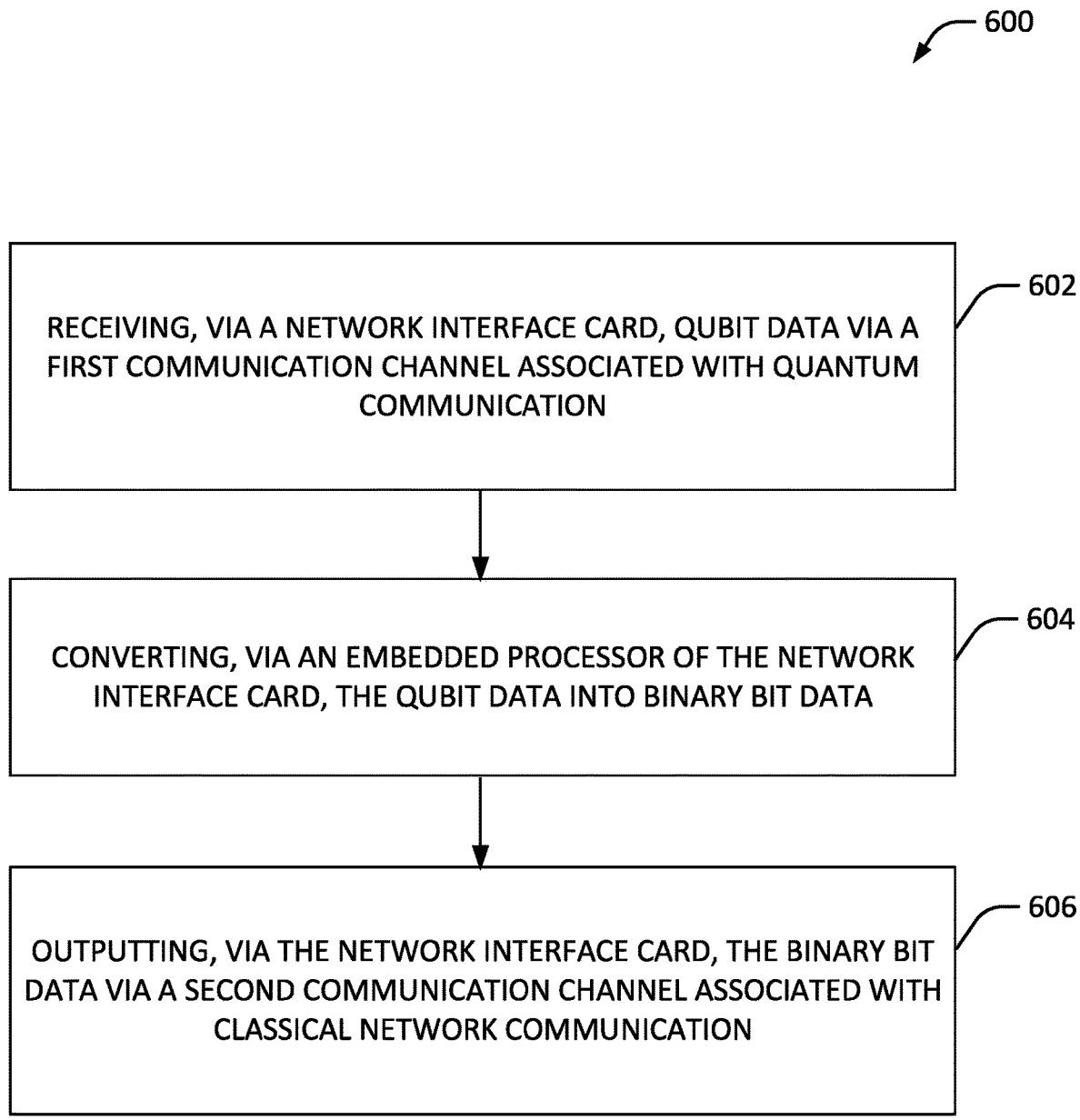

Having thus described the disclosure in general terms, reference will now be made to the accompanying drawings, which are not necessarily drawn to scale, and wherein:

FIG. 1 illustrates an exemplary system that facilitates quantum computing over classical and quantum communication channels, in accordance with one or more embodiments of the present disclosure;

FIG. 2 illustrates an exemplary system that includes a network interface card, in accordance with one or more embodiments of the present disclosure;

FIG. 3 illustrates an exemplary system that facilitates communication between a quantum computer, a network interface card, and one or more purpose-specific components, in accordance with one or more embodiments of the present disclosure;

FIG. 4 illustrates an exemplary system that includes a set of network interface cards that facilitate quantum computing over classical and quantum communication channels, in accordance with one or more embodiments of the present disclosure;

FIG. 5 illustrates an exemplary system that facilitates communication between a quantum computer, a network interface card, and a high-performance computing system, in accordance with one or more embodiments of the present disclosure;

FIG. 6 is a flowchart illustrating an example method for facilitating quantum computing over classical and quantum communication channels; and FIG. 7 illustrates an example computing system that may be embedded in a network interface card, in accordance with one or more embodiments of the present disclosure.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. Thus, use of any such terms should not be taken to limit the spirit and scope of embodiments of the present invention.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Traditionally, datacenters and high-performance computing (HPC) clusters include communication links, adapters, switches and purpose-specific components, and/or other computing components. Switches in datacenters and/or HPC clusters generally distribute data flows through communication links to adapters and/or purpose-specific components. Purpose-specific components include, for example, classical processing components (e.g., a central processing unit (CPU), a graphics processing unit (GPU), etc.), reconfigurable processing components (e.g., field-programmable gate array (FPGA), application-specific integrated circuit (ASIC), etc.), memory components (e.g., dynamic random-access memory (DRAM), persistent memory, etc.), and/or other types of processing components. Furthermore, quantum technologies have also recently been introduced to datacenters and HPC clusters. For example, quantum computing and/or quantum communications is becoming increasingly desirable for datacenters and HPC clusters.

Often times, quantum communications are employed in datacenters and/or HPC clusters to minimize cybercrime and/or improve privacy with respect to data within the datacenters and/or the HPC clusters. However, security of information within datacenters and/or HPC clusters generally depends on conventional public key encryption schemes. As such, with conventional public key encryption schemes, security vulnerabilities still exist for datacenters and/or HPC clusters. For example, with tradition key exchange protocols, it is possible to obtain unauthorized access to a datacenter system and/or HPC cluster provided that adequate processing power is available to an unauthorized device. An unauthorized access to a datacenter system can include, for example, a security vulnerability with respect to hardware (e.g., unauthorized access to fiber links, etc.) and/or a security vulnerability with respect to software (e.g., unauthorized access to data in a collocation facility, etc.). With the advent of quantum computers, the availability of processing power is expected to scale exponentially. As such, operational quantum computers are expected to be capable of hacking traditional encryption related to tradition key exchange protocols within a realistic timeframe, giving rise to an increased security threat for datacenter systems.

In an implementation, quantum cryptography can be employed to provide improved security for a datacenter system and/or HPC cluster. Quantum cryptography can include post-quantum algorithms. Post-quantum algorithms generally rely on the fact that there is no known way to solve the post quantum algorithms within a realistic timeframe using a quantum computer. However, post-quantum algorithms generally employ complex processing with increased hardware at a host system. In another implementation, Quantum Key Distribution (QKD) can be employed to provide improved security for a datacenter system. QKD is a technology that offers information theoretic security, which renders it inherently unhackable. In an aspect, QKD technology is based on dedicated optical hardware that alleviates processing requirements imposed, for example, by post-quantum algorithms.

QKD technology generally employs specialized optical components and/or dedicated optical paths. However, it is generally not economically viable to deploy QKD technology in every network interface controller or every network switch within a datacenter network. QKD technology can include continuous variable QKD (CV-QKD) systems and/or discrete variable QKD (DV-QKD) systems. DV-QKD systems rely on the generation and transmission of coherent states of light and subsequent detection using single photon detectors. CV-QKD systems, on the contrary, rely on coherent communications techniques where quantum states are encoded on continuous waves. Both CV-QKD systems and DV-QKD systems employ signal processing algorithms after optical detection. As such, with CV-QKD systems and DV-QKD systems, network interfaces cards are generally employed to off-load such computations associated with signal processing in order to decouple the technology of choice in the communication channel (e.g., regular communications vs quantum communications) from processing of information at a network node.

With a conventional network architecture, L communication links are bundled and each of the communication links generally contain M channels provided to respective network interface cards, where L and M are integers. The respective network interface cards convert the M channels into N channels configured in a suitable format to interact with one or more purpose-specific components such as a processing unit (e.g., a CPU, a GPU, an FPGA, an ASIC, etc.), a memory component, a switch, or another type of purpose-specific component, where N is also an integer. Accordingly, the introduction of quantum communication within a conventional network architecture results in communication links, which are conventionally based on non-return to zero (NRZ) coding or pulse-amplitude modulation (PAM)-4 coding, that are also based on CV-QKD and DV-QKD, leading to a heterogeneous mix of communication channels within the network architecture.

As a result, it is generally difficult and/or inefficient to introduce quantum computing and/or quantum communications within a datacenter and/or a HPC cluster configured for classical computing and/or classical communications. For example, a CV-QKD system generally employs a coherent receiver, either with a local oscillator (LO) providing a stable carrier to establish coherence or by employing self-homodyne schemes where the LO is located at the transmitter to reduce the complexity of the receiver. In another example, a DV-QKD system generally employs single photon counters, which in turn generally require inefficient temperature control (e.g., normally approximately absolute zero). Moreover, QKD conventionally requires local processing to covert quantum bits (qubits) into classical binary bits. For example, additional components for processing of quantum communication information, generally results in increased latency, increased power consumption, and/or increased cost of components (e.g., additional processors, etc.) for a datacenter system and/or HPC clusters.

Thus, to address these and/or other issues, a network interface card for quantum computing over classical and quantum communication channels is disclosed herein. For instance, the system architecture disclosed herein facilitates deployment of QKD technology in a datacenter network. As such, by employing the QKD technology, datacenter connections can be provided with technological benefits such as, for example, improved security (e.g., to provide information-theoretic security for a datacenter network, etc.), improved performance, improved efficiency, reduced processing load for a datacenter system, and/or one or more other technological benefits. In one or more embodiments, an embedded processor within a network interface card is employed to perform quantum processing (e.g., processing of one or more quantum algorithms). The embedded processor can be, for example, a system on chip (SoC), an FPGA, a GPU, a CPU, or another type of processor. In one or more embodiments, quantum processing includes converting qubits received via a quantum communication link into binary bits. Therefore, instead of employing a dedicated ASIC (e.g., a DSP processor of a coherent processor) to conduct quantum processing, a network interface card can employ an embedded processor within the network interface card to conduct quantum processing. Furthermore, by employing an embedded processor within a network interface card to conduct quantum processing, an interface between QKD-based communications and non-QKD based communications can be provided. Accordingly, improved utilization of quantum computers within datacenters and/or HPC clusters can be provided. For example, in certain implementations a quantum computer can operate within a quantum framework and can also access external resources (e.g., memory blocks) configured for binary-based communications. Moreover, as compared to conventional datacenter networks, embodiments disclosed herein provide for improved security for a datacenter network, improved performance for a datacenter network, and/or improved efficiency for a datacenter network.

FIG. 1 illustrates a system 100 according to one or more embodiments of the present disclosure. The system 100 includes a network interface card (NIC) 102. The NIC 102 is, for example, a hardware component (e.g., a network interface controller) configured to connect to a network and/or to facilitate communications within the network. In certain embodiments, the NIC 102 can be included in and/or can be coupled to a network interface module such as a transceiver device (e.g., an optical transceiver) that facilitates fiber optic communication. In one or more embodiments, the NIC 102 can be configured to manage transmission of one or more optical signals via an optical fiber. Additionally or alternatively, in one or more embodiments, the NIC 102 can be configured to control emission of one or more optical signals via a laser.

The NIC 102, as depicted in FIG. 1, is coupled to a communication channel 104 and a communication channel 106. The communication channel 104 may be a first communication channel associated with quantum communication (e.g., a QKD-based communication). The communication channel 106 may be a second communication channel associated with classical network communication (e.g., non-QKD-based communication). In one or more embodiments, the communication channel 106 is an optical communication channel (e.g., a transparent fiber optical connection) that transmits data (e.g., pulses of infrared light) encoded via qubits (e.g., a quantum communication data stream). In one or more embodiments, the communication channel 106 is an optical communication channel (e.g., a transparent fiber optical connection) that transmits data (e.g., pulses of infrared light) encoded via bits (e.g., a binary data stream). Accordingly, the NIC 102 can be configured to interface a QKD-based communication medium and a non-QKD-based communication medium. In an embodiment, the NIC 102 is configured to receive qubit data 108 via the communication channel 104. The qubit data 108 can include, for example, one or more qubits associated with quantum information. Furthermore, in an embodiment, the NIC 102 is configured to output binary bit data 110 via the communication channel 106. The binary bit data 110 can include, for example, one or more classical binary bits associated with binary information. In one or more embodiments, the communication channel 104 and/or the communication channel 106 can be bi-directional. As such, in another embodiment, the NIC 102 is configured to output the qubit data 108 via the communication channel 104. Furthermore, in another embodiment, the NIC 102 is configured to receive the binary bit data 110 via the communication channel 106.

FIG. 2 illustrates a system 100' according to one or more embodiments of the present disclosure. The system 100' is an alternate embodiment of the system 100 and includes the NIC 102. In one or more embodiments, the NIC 102 includes an optical transceiver 202, a switch 204, a processor 206, and/or a memory 208. In an embodiment, the optical transceiver 202 is configured as an optical receiver (e.g., an optical coherent receiver) that receives the qubit data 108 via the communication channel 104. In another embodiment, the optical transceiver 202 is configured as an optical transmitter that transmits the qubit data 108 via the communication channel 104. The switch 204 is configured to output the binary bit data 110. In an alternate embodiment, the switch 204 is configured to receive the binary bit data 110. In one or more embodiments, the switch 204 is a network switch (e.g., an interface device) configured to transmit and/or receive the binary bit data 110. For example, in an embodiment, the switch 204 is a peripheral component interconnect express (PCIe) switch configured to connect to one or more purpose-specific components such as one or more classical processing components (e.g., one or more CPUs and/or one or more GPUs), one or more reconfigurable processing components (e.g., one or more FPGAs and/or one or more ASICs), one or more memory components (e.g., DRAM and/or persistent memory), one or more network switches, and/or one or more other types of purpose-specific components.

The processor 206 may be an embedded processor. For instance, in one or more embodiments, the processor 206 is embedded within the NIC 102. In one or more embodiments, the processor 206 performs quantum processing (e.g., processing of one or more quantum algorithms) with respect to the qubit data 108. For example, in one or more embodiments, the processor 206 is configured as a hardware accelerator that performs quantum processing (e.g., processing of one or more quantum algorithms) with respect to the qubit data 108. In one or more embodiments, the processor 206 converts the qubit data 108 into the binary bit data 110. Furthermore, in such embodiments, the switch 204 outputs the binary bit data 110 (e.g., the binary bit data 110 generated by the processor 206) via the communication channel 106. Alternatively, in one or more embodiments, the processor 206 converts the binary bit data 110 into the qubit data 108. Furthermore, in such embodiments, the optical transceiver 202 outputs the qubit data 108 (e.g., the qubit data 108 generated by the processor 206) via the communication channel 104. In one or more embodiments, the memory 208 is configured to store computer program code, firmware, and/or instructions employed by the processor 206 to perform the quantum processing.

In an embodiment, the processor 206 is an SoC that performs the quantum processing to convert the qubit data 108 into the binary bit data 110 and/or to convert the binary bit data 110 into the qubit data 108. In another embodiment, the processor 206 is a CPU or an array of CPUs that performs the quantum processing to convert the qubit data 108 into the binary bit data 110 and/or to convert the binary bit data 110 into the qubit data 108. In another embodiment, the processor 206 is a GPU or an array of GPUs that performs the quantum processing to convert the qubit data 108 into the binary bit data 110 and/or to convert the binary bit data 110 into the qubit data 108. In another embodiment, the processor 206 is an FPGA that performs the quantum processing to convert the qubit data 108 into the binary bit data 110 and/or to convert the binary bit data 110 into the qubit data 108. However, it is to be appreciated that, in certain embodiments, the processor 206 is another type of embedded processing block configured to perform the quantum processing to convert the qubit data 108 into the binary bit data 110 and/or to convert the binary bit data 110 into the qubit data 108.

In one or more embodiments, the optical transceiver 202 determines amplitude data associated with the qubit data 108. Furthermore, the processor 206 performs the quantum processing to convert the qubit data 108 into the binary bit data 110 based on the amplitude data. Additionally or alternatively, in one or more embodiments, the optical transceiver 202 determines phase data associated with the qubit data 108. Furthermore, the processor 206 additionally or alternatively performs the quantum processing to convert the qubit data 108 into the binary bit data 110 based on the on the phase data. In one or more embodiments, the processor 106 performs the quantum processing to convert the qubit data 108 into the binary bit data 110 based on a QKD protocol associated with the qubit data 108. Additionally or alternatively, in one or more embodiments, the processor 106 performs the quantum processing to convert the binary bit data 110 into the qubit data 108 based on a QKD protocol associated with the qubit data 108.

In one or more embodiments, the processor 206 is configured to further perform digital signal processing with respect to the binary bit data 110 and/or the qubit data 108. For example, in one or more embodiments, the processor 206 performs signal conditioning for the binary bit data 110, chromatic dispersion for the binary bit data 110, quadrature imbalance correction for the binary bit data 110, multiplexing for the binary bit data 110, polarization demultiplexing for the binary bit data 110, carrier frequency estimation for the binary bit data 110, carrier phase estimation for the binary bit data 110, equalization for the binary bit data 110, symbol mapping for the binary bit data 110, symbol demapping for the binary bit data 110, and/or other signal processing for the binary bit data 110 to facilitate transmission of the binary bit data 110 via the communication channel 106. In one or more embodiments, the processor 206 is configured to further perform one or more key exchange protocols and/or one or more handshake protocols with respect to the binary bit data 110 and/or the qubit data 108.

FIG. 3 illustrates a system 300 according to one or more embodiments of the present disclosure. The system 300 includes the NIC 102, a quantum computer 302, and/or one or more purpose-specific components 304. In the depicted embodiment, the NIC 102 is communicatively coupled to the quantum computer 302 via the communication channel 104, and the NIC 102 is communicatively coupled to the one or more purpose-specific components 304 via the communication channel 106. In one or more embodiments, L communication links are bundled and attached to the quantum computer 302, and a communication link attached to the NIC 102 includes M channels. Furthermore, in one or more embodiments, the NIC 102 converts the M channels into N channels formatted for the one or more purpose-specific components 304.

The quantum computer 302 is configured to generate the qubit data 108 and/or transmit the qubit data 108 via the communication channel 104. In one or more embodiments, the quantum computer 302 is configured to perform quantum computing related to quantum states to generate the qubit data 108. For example, in one or more embodiments, the quantum computer 302 is configured to perform quantum computations using superposition, interference, entanglement, and/or one or more other quantum computing techniques to generate the qubit data 108. In an embodiment, the quantum computer 302 is a quantum processing unit (QPU). The one or more purpose-specific components 304 may include one or more classical processing components (e.g., one or more CPUs and/or one or more GPUs), one or more reconfigurable processing components (e.g., one or more FPGAs and/or one or more ASICs), one or more memory components (e.g., DRAM and/or persistent memory), one or more network switches, and/or one or more other types of purpose-specific components. The one or more purpose-specific components 304 may be configured to receive the binary bit data 110 and/or transmit the binary bit data 110 via the communication channel 106. In one or more embodiments, one or more purpose-specific components 304 are configured to generate at least a portion of the binary bit data 110.

FIG. 4 illustrates a system 400 according to one or more embodiments of the present disclosure. In the depicted embodiment, the system 400 includes a set of NICs 102a-n. In one or more embodiments, respective NICs from the set of NICs 102a-n can be communicatively coupled to the quantum computer 302 and/or the one or more purpose-specific components 304. In one or more embodiments, respective NICs from the set of NICs 102a-n can be configured to receive qubit data and/or transmit binary bit data. Furthermore, respective NICs from the set of NICs 102a-n can be configured as the NIC 102 illustrated in FIG. 2. For example, the NIC 102a can correspond to the NIC 102. Furthermore, the NIC 102a can receive the qubit data 108 via the communication channel 104 and transmit the binary bit data 110 via the communication channel 106. The NICs 102b-n can also be configured to perform quantum processing to convert qubit data into binary bit data 110 in a similar manner.

FIG. 5 illustrates a system 300' according to one or more embodiments of the present disclosure. The system 300' can be an alternate embodiment of the system 300. The system 300' as depicted includes the NIC 102, the quantum computer 302, and/or a high-performance computing (HPC) system 502. The NIC 102 may be communicatively coupled to the quantum computer 302 via the communication channel 104, and the NIC 102 may be communicatively coupled to HPC system 502 via the communication channel 106. In one or more embodiments, L communication links are bundled and attached to the quantum computer 302, and a communication link attached to the NIC 102 includes M channels. Furthermore, in one or more embodiments, the NIC 102 converts the M channels into N channels formatted for the HPC system 502.

The HPC system 502 can be a computing system (e.g., a supercomputer) that processes data at an increased level of performance as compared to a general-purpose computing system. For example, the HPC system 502 can process data in accordance with floating-point operations per second (FLOPS) computational speed and/or parallel processing. In an embodiment, the HPC system 502 can process a set of workloads based on data provided by the NIC 102 and/or another component of a network. According to various embodiments, the HPC system 502 can be an HPC room in a datacenter network. For instance, the HPC system 502 can include a set of processor cores and/or a plurality of server routers communicatively coupled via a first set of classical data links (e.g., classical data channels). In one or more embodiments, a remote direct memory access (RDMA) packet 502 transmitted between the NIC 102 and the HPC system 502 can be employed to manage a quantum hop count 506. The quantum hop count 506 can correspond to a number of intermediate routers associated with transmission of the RDMA packet 502 between the NIC 102 and one or more components (e.g., one or more purpose-specific components) of the HPC system 502. In one or more embodiments, processing performed by the NIC 102 (e.g., processing performed by the processor 206 of the NIC 102) can be performed based on the quantum hop count 506. In an embodiment, a time window for processing performed by the NIC 102 (e.g., processing performed by the processor 206 of the NIC 102) can be determined based on the quantum hop count 506.

FIG. 6 is a flowchart illustrating an example method for facilitating quantum computing over classical and quantum communication channels in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 6 may, for example, be performed by an example computing system 700 (shown in FIG. 7) that is embedded in a network interface card (e.g., NIC 102), a processor (e.g., processor 206), an optical transceiver (e.g., optical transceiver 202), and/or a switch (e.g., switch 204). In some embodiments, the computing system 700 is a firmware computing system embedded in a network interface card (e.g., NIC 102), a processor (e.g., processor 206), an optical transceiver (e.g., optical transceiver 202), and/or a switch (e.g., switch 204). In one or more embodiments, one or more of the operations illustrated in FIG. 6 may, for example, be performed by a network interface card (e.g., NIC 102), a processor (e.g., processor 206), an optical transceiver (e.g., optical transceiver 202), and/or a switch (e.g., switch 204). In one or more embodiments, at operation 602, the computing system 700 receives, via a network interface card, qubit data via a first communication channel associated with quantum communication. In one or more embodiments, at operation 604, the computing system 700 converts, via an embedded processor of the network interface card, the qubit data into binary bit data. In one or more embodiments, at operation 606, the computing system 700 outputs, via the network interface card, the binary bit data via a second communication channel associated with classical network communication.

FIG. 7 illustrates the computing system 700 that may be embedded in a network interface card. In some cases, the computing system 700 may be a firmware computing system communicatively coupled with, and configured to control, one or more circuit modules in the network interface card. For example, the computing system 700 may be a firmware computing system communicatively coupled with one or more circuit modules. The computing system 700 may include or otherwise be in communication with a processor 710, a memory 720, and communication circuitry 730. In some embodiments, the processor 710 (which may include multiple or co-processors or any other processing circuitry associated with the processor) may be in communication with the memory 720. The memory 720 may comprise non-transitory memory circuitry and may include one or more volatile and/or non-volatile memories. In some examples, the memory 720 may be an electronic storage device (e.g., a computer readable storage medium) configured to store data that may be retrievable by the processor 710. In some examples, the data stored in the memory 620 may include the quantum communication protocol data, quantum computing data, quantum computing algorithm data, or the like for enabling the apparatus to carry out various functions or methods in accordance with embodiments of the present invention, described herein. In one or more embodiments, the processor 710 corresponds to the processor 206 and/or the memory 720 corresponds to the memory 208.

In some examples, the processor 710 may be embodied in a number of different ways. For example, the processor may be embodied as one or more of various hardware processing means such as a microprocessor, a coprocessor, a digital signal processor (DSP), or a processing element with or without an accompanying DSP. The processor 710 may also be embodied in various other processing circuitry including integrated circuits such as, for example, an FPGA, a SoC, a CPU, an array of CPUs, a GPU, an array of GPUs, a hardware accelerator, or a special-purpose embedded electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading.

In an example embodiment, the processor 710 may be configured to execute instructions, such as computer program code or instructions, stored in the memory 720 or otherwise accessible to the processor 710. Alternatively or additionally, the processor 710 may be configured to execute hard-coded functionality. As such, whether configured by hardware or software instructions, or by a combination thereof, the processor 710 may represent a computing entity (e.g., physically embodied in circuitry) configured to perform operations according to an embodiment of the present invention described herein. For example, when the processor 710 is embodied as an FPGA, a SoC, a CPU, an array of CPUs, a GPU, an array of GPUs, a hardware accelerator, a special-purpose embedded electronic chip, or similar, the processor 710 may be configured as hardware for conducting the operations of an embodiment of the invention.

The computing system 700 may optionally also include the communication circuitry 730. The communication circuitry may be any means embodied in either hardware or a combination of hardware and software that is configured to receive and/or transmit data from/to a network and/or any other device or module in communication with the computing system 700. In this regard, the communication interface may include, for example, supporting hardware and/or software for enabling communications. As such, for example, the communication circuitry 730 may include a communication modem and/or other hardware/software for supporting communication via cable, universal serial bus (USB), integrated circuit receiver, or other mechanisms.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A network interface card (NIC) apparatus comprising:
   an optical receiver supported by the NIC apparatus, communicably coupled with a first communication channel associated with quantum communication, and configured to receive qubit data via the first communication channel;
   an embedded processor embedded in the NIC apparatus, communicably coupled with the optical receiver, and configured to:
   receive qubit data from the optical receiver; and
   convert the qubit data into binary bit data; and
   a network switch supported by the NIC apparatus, communicably coupled with the embedded processor, and configured to:
   Receive the binary data from the embedded processor; and
   output the binary bit data via a second communication channel associated with classical network communication.

2. The NIC apparatus of claim 1, wherein the optical receiver is configured to determine amplitude data associated with the qubit data, and wherein the embedded processor is configured to convert the qubit data into the binary bit data based on the amplitude data.

3. The NIC apparatus of claim 1, wherein the optical receiver is configured to determine phase data associated with the qubit data, and wherein the embedded processor is configured to convert the qubit data into the binary bit data based on the phase data.

4. The NIC apparatus of claim 1, wherein the embedded processor is configured to convert the qubit data into the binary bit data based on a quantum key distribution (QKD) protocol associated with the qubit data.

5. The NIC apparatus of claim 1, wherein the embedded processor is configured to further perform digital signal processing with respect to the binary bit data.

6. The NIC apparatus of claim 5, wherein the digital signal processing performed by the embedded processor comprises one or more of:
signal conditioning for the binary bit data;
chromatic dispersion for the binary bit data,
quadrature imbalance correction for the binary bit data;
multiplexing for the binary bit data;
polarization demultiplexing for the binary bit data;
carrier frequency estimation for the binary bit data;
carrier phase estimation for the binary bit data;
equalization for the binary bit data; or
symbol mapping for the binary bit data.

7. The NIC apparatus of claim 1, wherein the first communication channel is associated with M channels, and the second communication channel is associated with N channels.

8. The NIC apparatus of claim 7, wherein the embedded processor is configured to convert the M channels into N channels for use by one or more components communicably coupled with the second communication channel.

9. The NIC apparatus of claim 1, wherein the embedded processor is configured to perform one or more key exchange protocols and/or one or more handshake protocols with respect to the binary bit data and/or the qubit data.

10. The NIC apparatus of claim 1, wherein the embedded processor is further configured to manage transmission of a remote direct memory access (RDMA) packet to a high-performance computing (HPC) system communicably coupled with the NIC via the second communication channel.

11. The NIC apparatus of claim 10, wherein the embedded processor is configured to manage a hop count indicative of a number of intermediate routers associated with transmission of the RDMA packet between the NIC and the HPC system.

12. The NIC apparatus of claim 11, wherein one or more processing operations performed by the embedded processor are based on the quantum hop count.

13. The NIC apparatus of claim 11, wherein a time window for processing performed by the embedded processor is based on the quantum hop count.

14. A system comprising:
a quantum computer; and
a network interface card (NIC) communicably coupled with the quantum computer via a first communication channel associated with quantum communication comprising:
an optical receiver supported by the NIC apparatus configured to receive qubit data from the quantum computer;
an embedded processor embedded in the NIC apparatus, communicably coupled with the optical receiver, and configured to:
receive qubit data from the optical receiver; and
convert the qubit data into binary bit data; and
a network switch supported by the NIC apparatus, communicably coupled with the embedded processor, and configured to:
receive the binary data from the embedded processor; and
output the binary bit data via a second communication channel associated with classical network communication.

15. The system of claim 14, wherein the optical receiver is configured to determine amplitude data associated with the qubit data, and wherein the embedded processor is configured to convert the qubit data into the binary bit data based on the amplitude data.

16. The system of claim 14, wherein the optical receiver is configured to determine phase data associated with the qubit data, and wherein the embedded processor is configured to convert the qubit data into the binary bit data based on the phase data.

17. The system of claim 14, wherein the embedded processor is configured to convert the qubit data into the binary bit data based on a quantum key distribution (QKD) protocol associated with the qubit data.

18. The system of claim 14, wherein the embedded processor is configured to further perform digital signal processing with respect to the binary bit data.

19. The system of claim 14, wherein the system further comprises a plurality of NICs including the NIC, wherein each NIC of the plurality of NICs is operably coupled with the first communication channel and the second communication channel.

20. The system of claim 19, wherein the first communication channel is associated with M channels, and the second communication channel is associated with N channels, wherein each of the NICs is configured to convert the M channels into N channels for use by one or more components communicably coupled with the second communication channel.

* * * * *